(No Model.)  2 Sheets—Sheet 1.

P. KILTZ.
TRUCK.

No. 430,130.  Patented June 17, 1890.

Witnesses  Inventor.
Peter Kiltz (No Model.) 2 Sheets—Sheet 2.
P. KILTZ.
TRUCK.
No. 430,130. Patented June 17, 1890.
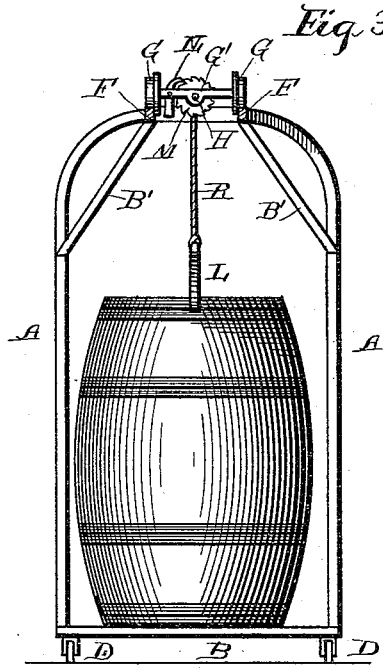
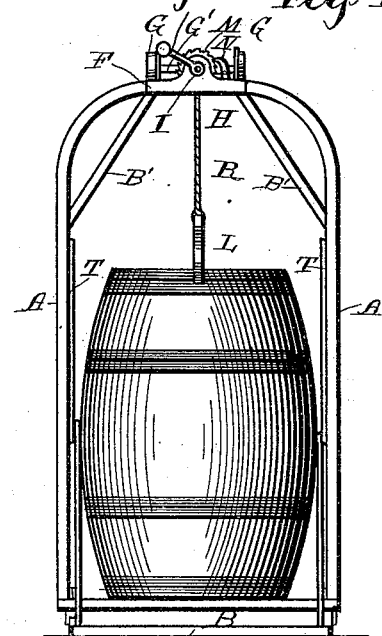
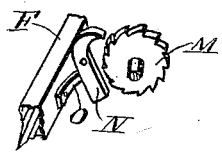
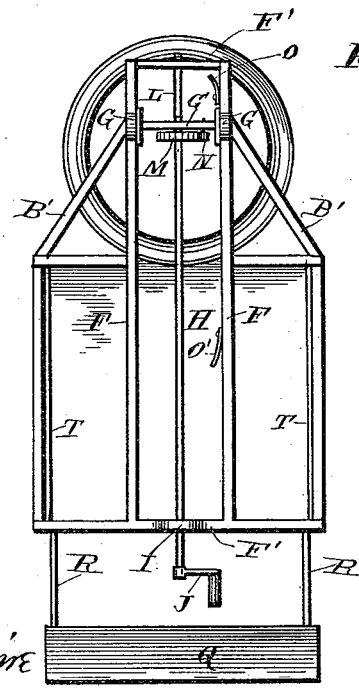
Witnesses.
C. C. Burchine
J. R. Davis
Inventor
Peter Kiltz
per R. J. Du Bois
his Atty.

UNITED STATES PATENT OFFICE.

PETER KILTZ, OF RICH HILL, MISSOURI.

TRUCK.

SPECIFICATION forming part of Letters Patent No. 430,130, dated June 17, 1890.

Application filed April 11, 1890. Serial No. 347,491. (No model.)

*To all whom it may concern:*

Be it known that I, PETER KILTZ, a citizen of the United States, residing at Rich Hill, in the county of Bates and State of Missouri, have invented certain new and useful Improvements in Trucks; and I do hereby declare the following to be a full, clear, and exact description of the invention, such as will enable others skilled in the art to which it appertains to make and use the same.

My invention relates to that class of trucks especially adapted for lifting and carrying barrels, stoves, and other heavy articles to be transported from one place to another, and the object sought to be attained is to produce a more simple, serviceable, and convenient device than has heretofore been in use.

With this end in view my invention consists in certain peculiarities of construction and combinations of parts, more fully described hereinafter, and pointed out in the claims.

Figure 1:
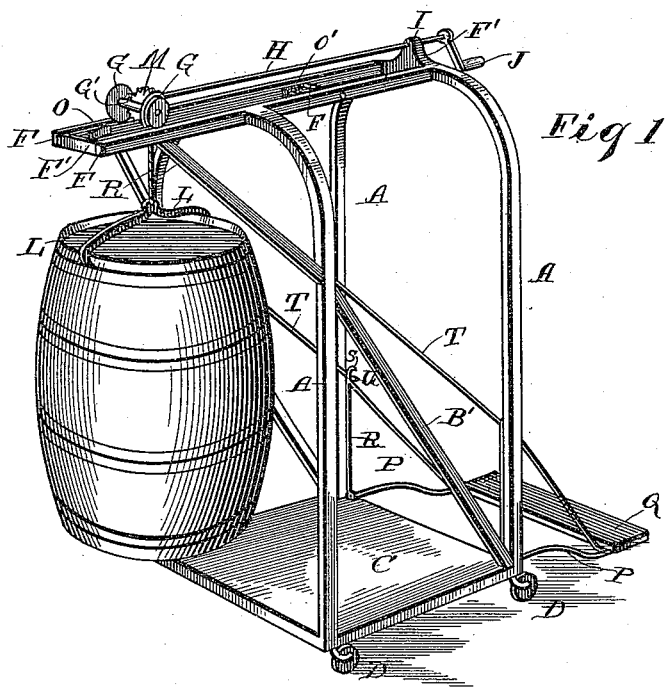
Figure 2:
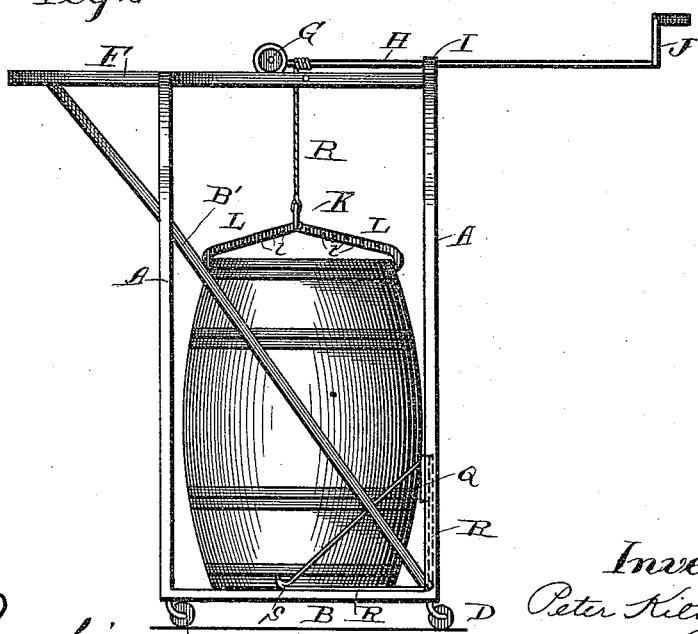

Referring to the accompanying drawings, Figure 1 is a perspective view of the complete structure, showing the barrel after it has been elevated from the floor; Fig. 2, a side elevation showing it drawn in resting on the platform of the truck; Fig. 3, a front view; Fig. 4, a rear view, and Fig. 5 a plan.

The frame of the truck consists of the uprights or corner-posts A, joined at the bottom by the cross-pieces B, on which the platform C is mounted, and this frame travels on suitable casters D. The uprights A converge at their upper ends and are secured to the horizontal tracks or ways E, which project beyond the front of the track and are braced and strengthened by the long brace-rods B', extending from the lower rear corner of the frame. The tracks F are placed a suitable distance apart and connected at their opposite ends by short cross-bars F', and upon them travels a pair of flanged wheels G, connected by an axle G' and arranged to revolve upon it, thus constituting a wheeled carriage. A shaft or rod H has its outer end mounted loosely in the center of the axle G', and is confined therein by suitable means, and extends rearwardly therefrom parallel with the tracks F, and is mounted at its rear end in a guide or box I projecting from the rear cross-bar F'. Beyond this point it is bent to form a crank or handle J, by means of which it is manipulated. This shaft acts as a windlass, on which is wound the rope or cable R at its forward end back of the traveling wheels, and to the lower end of this rope is secured a ring K, which connects the arms L of the grappling-hook. These arms are provided with perforations *l* to render them adjustable by engagement of the ring K in said perforations. A ratchet-wheel M is fixed on the shaft H immediately behind the axle G', and a gravity-pawl N is pivoted to said axle to engage said ratchet-wheel, as seen more clearly in Fig. 3. The ratchet, however, must be free of the pawl at the forward and rear position of the traveling wheels, as will hereinafter appear, and for this purpose I provide a pair of flat springs O O', secured to the inside of one of the tracks and projecting therefrom to bear against the lower end of the gravity-pawl and throw it off the ratchet.

The weight of the barrel on the outer ends of the tracks is counterbalanced by means of a pair of levers P, pivoted inside the frame at the lower rear corners of the same, and provided with a treadle Q, extending across between them, on which the operator stands, thus applying his weight to prevent the truck from tipping forward, as will now appear. To the rear end of each lever is fastened a rod R, which extends at right angles thereto, forming with it a bell-crank lever, and this rod is doubled to form an upwardly-turned hook S, and thence extends to the forward end of the lever, to which it is attached, thus forming with it a triangular frame or bracket.

A rod T is fastened to each side of the frame to the insides of the uprights, and its lower or rear end is turned in to form a projection U, against which the hook of the triangular bracket abuts. Thus it is evident that when the treadle is turned down to the position shown in Fig. 1 and the operator stands upon it, his weight will act to counterbalance that of the barrel.

It will be seen that the brackets and treadle can be folded up inside the truck and out of the way when not in use, and that the weight of these brackets will prevent them from falling out.

With the parts in the position shown in Fig. 1, the shaft H is pushed forward, so that the front spring O engages the gravity-pawl N and releases it from the ratchet-wheel, when the grappling-hook will fall, and can be made to grasp the barrel in the desired manner. The operator, standing on the treadle Q, will next revolve the crank-arm J, thus winding the rope R upon the shaft and elevating the barrel, and upon pulling back the shaft the pawl will be freed from the spring O and will then engage the ratchet to hold the barrel in elevated position. A further draft upon the shaft will cause it to slide backward through its guide I, the carriage G G' at the same time traveling to the rear on the tracks F, and thus carrying the barrel inside the frame and above the platform C. When this point is reached, it will be seen that the rear spring O' will act to again throw the pawl free of the ratchet-wheel, and the barrel will thus drop upon the platform and can be conveyed where desired, and there again run out of the truck by pushing forward the shaft and deposited. If the barrel is to be placed upon a bench or shelf, it can be held in elevated position and readily swung to the desired position.

It is evident that many slight changes which might suggest themselves to a skilled mechanic could be resorted to without departing from the spirit and scope of my invention; hence I do not wish to confine myself to the precise construction shown.

Having thus described my invention, what I claim as new, and desire to secure by Letters Patent, is—

1. In a truck, a shaft mounted in suitable bearings and arranged to revolve to elevate the object to be transported, and to slide rearwardly to bring the latter inside the truck-frame, substantially as described.

2. In a truck, a track or way extending out in front of the frame, a carriage traveling on said track, and a shaft attached to said carriage and arranged to revolve to elevate the object to be transported, and to slide rearwardly to bring it inside the frame, substantially as described.

3. In a truck, the combination of a track projecting from the frame, a sliding shaft, a carriage arranged to travel on said track and in which the forward end of said shaft has a bearing, and a cable arranged to be wound upon the shaft to elevate the weight, substantially as described.

4. In a truck, the combination of a track projecting from the frame, a carriage traveling on said track, a shaft mounted at its forward end in said carriage, a ratchet-wheel on said shaft, and a pawl arranged to be automatically thrown in and out of engagement, substantially as described.

5. In a truck, the combination of a track, a carriage traveling thereon, a shaft mounted at its forward end in said carriage, a ratchet-wheel on said shaft, a gravity-pawl engaging said ratchet, and projections from said track for engaging said pawl to free the ratchet, substantially as described.

6. In a truck, a counterbalancing device consisting of a treadle, a pair of triangular brackets supporting it and pivoted at their corners to the truck-frame, hooks on the upper ends of said brackets, and projections from the inside of the truck arranged to be engaged by said hooks, substantially as and for the purpose described.

In testimony whereof I affix my signature in presence of two witnesses.

PETER KILTZ.

Witnesses:
W. C. STONEBRAKER,
J. A. STONEBRAKER.